United States Patent [19]

Okazaki

[11] Patent Number: 5,610,592
[45] Date of Patent: Mar. 11, 1997

[54] FIRE DETECTING APPARATUS

[75] Inventor: Toshiaki Okazaki, Tokyo, Japan

[73] Assignee: Nohmi Bosai Ltd., Tokyo, Japan

[21] Appl. No.: 283,169

[22] Filed: Aug. 3, 1994

[30] Foreign Application Priority Data

Aug. 4, 1993 [JP] Japan .................. 5-193320

[51] Int. Cl.$^6$ .................... G08B 17/00
[52] U.S. Cl. .............. 340/628; 340/607; 340/630; 55/327; 55/487; 110/216
[58] Field of Search .................. 340/607, 628, 340/629, 630, 632, 627; 55/320, 327, 485, 486, 487; 110/216, 217; 250/573, 574

[56] References Cited

U.S. PATENT DOCUMENTS

| | | | |
|---|---|---|---|
| 3,765,842 | 10/1973 | Purt | 340/633 |
| 4,478,619 | 10/1984 | Arends et al. | 96/132 |
| 4,680,576 | 7/1987 | Bauer | 340/630 |
| 4,886,527 | 12/1989 | Fottinger et al. | 55/487 |
| 5,420,440 | 5/1995 | Ketler et al. | 340/630 |

FOREIGN PATENT DOCUMENTS

| | | |
|---|---|---|
| 0324295 | 7/1989 | European Pat. Off. . |
| 0353903 | 2/1990 | European Pat. Off. . |
| WO9115836 | 10/1991 | WIPO . |

*Primary Examiner*—Jeffery Hofsass
*Assistant Examiner*—Edward Lefkowitz
*Attorney, Agent, or Firm*—Wenderoth, Lind & Ponack

[57] ABSTRACT

A first dust recovering part is disposed upstream in an air inlet passage from a fire detecting part. The air flow is deflected in the first dust recovering part so as to cause the dust to drop to separate from the air and to be recovered in a recovery area of the first recovering part. Farther downstream from the first dust recovering part, a second dust recovering part is arranged having a filter for recovering dust in the air which has passed through the first dust recovering part. Thus, clogging of the filter is avoided and erroneous operations caused by dust are more reliably reduced. As a result, the reliability of the fire detecting apparatus is improved.

5 Claims, 5 Drawing Sheets

FIRE DETECTING APPARATUS

BACKGROUND OF THE INVENTION

1. Field of the Invention

The present invention relates to a fire detecting apparatus for detecting a fire through sensing smoke occurring in the case of a fire so as to detect the presence of a fire and, more particularly, to a fire detecting apparatus which is capable of avoiding erroneous operations caused by dust.

2. Description of the Related Art

Conventionally, a fire detecting part of the fire detecting apparatus of this type is known such as the ionization type of detector, light scattering type, or light obscuration type. No matter which type is used, such a fire detecting part detects smoke in the air drawn from a supervision area so as to detect the presence of a fire according to the density of the smoke.

FIG. 6 is a schematic view of the construction of one example of a conventional fire detecting apparatus of the light scattering type (photoelectric type). Referring to FIG. 6, an air inlet 2 is arranged to face a supervision area 1 and a filter 3 is provided for the air inlet 2. A detecting part case 4 is connected to the air inlet 2. A light-emitting device 5 is mounted on an inner wall of the detecting part case 4. Also, a light-receiving device 7 is mounted on a preamplifier 6 arranged within the detecting part case 4. A plurality of light-screening plates 8 protrude from the inner walls of the detecting part case 4. The fire detecting part 9 comprises the above-noted detecting part case 4, the light-emitting device 5, the preamplifier 6, the light-receiving device 7 and the light-screening plates 8. A suction fan 10 is connected to the outside of the detecting part case 4. A fire determining part 11 is electrically connected to the preamplifier 6.

The operation of the above fire detecting apparatus will now be described. The suction fan 10 is driven so as to allow the air in the supervision area 1 to be drawn into the detecting part case 4 from the air inlet 2 through the filter 3 and to be discharged from the suction fan 10. During this procedure, in the detecting part case 4 the light-emitting device 5 emits light, which is normally screened by the light-screening plates 8, thereby preventing the light from being received by the light-receiving device 7.

However, when smoke is present in the air drawn into the detecting part case 4, the light emitted from the light-emitting device 5 is scattered due to smoke particles and is received by the light-receiving device 7, thereby detecting the smoke. When the smoke is thus detected by the light-receiving device 7, a signal according to the density of the smoke is transmitted via the preamplifier 6 to the fire determining part 11, which determines whether or not a fire has occurred. Although usual fire detecting apparatuses determine the presence of a fire at a smoke density of approximately 10%, some apparatuses used in clean rooms, computer rooms, and other places determine the presence of a fire at a smoke density of approximately from 0.01% to 0.5% since the drawn air is clean.

The conventional fire detecting apparatus constructed as described above presents the following problems. When the dust floating in the supervision area 1, together with the air, is drawn into the fire detecting part 9, it scatters the light emitted from the light-emitting device 5 as smoke does. Thus, even though the density of the smoke does not reach a value required for determining a fire, the fire determining part 11 determines the presence of a fire due to the dust, thus resulting in an erroneous operation. In particular, since fire detecting apparatuses used in clean rooms and computer rooms determine the presence of a fire with a considerably lower density of smoke, as stated above, they are significantly influenced by dust. Further, in the apparatus shown in FIG. 6, the filter 3 is provided for the air inlet 2 in order to decrease dust which will flow into the fire detecting part 9. However, in order to recover dust by a single-stage filer 3, it is necessary to some degree to form a filter with small meshes, and accordingly, the filter is likely to be clogged with relatively large dust particles, dirt, and the like.

SUMMARY OF THE INVENTION

Accordingly, in order to solve the above problems, an object of the present invention is to provide a fire detecting apparatus which is able to more reliably avoid erroneous operations caused by dust in the air and to improve reliability.

In order to achieve the above object, according to a first aspect of the present invention, there is provided a fire detecting apparatus comprising: a fire detecting part for detecting the presence of a fire by detecting smoke in the air drawn from a supervision area; a first dust recovering part arranged at a midpoint in an inlet passage of the air into the fire detecting part so as to deflect the air flow, thereby causing dust to drop and separate from the air flow and to be recovered by the recovering part; and a second dust recovering part arranged downstream from the first dust recovering part in the inlet passage and having a filter for recovering dust in the air which has passed through the first dust recovering part.

According to a second aspect of the present invention, there is provided a fire detecting apparatus comprising: a fire detecting part for detecting the presence of a fire by detecting smoke in the air drawn from a supervision area; and a dust recovering part arranged at a midpoint in an inlet passage of the air into the fire detecting part and having a plurality of filters placed from upstream in the order of larger to smaller meshes so as to recover dust in the air.

DESCRIPTION OF THE PREFERRED EMBODIMENTS

First Embodiment

Figure 1:
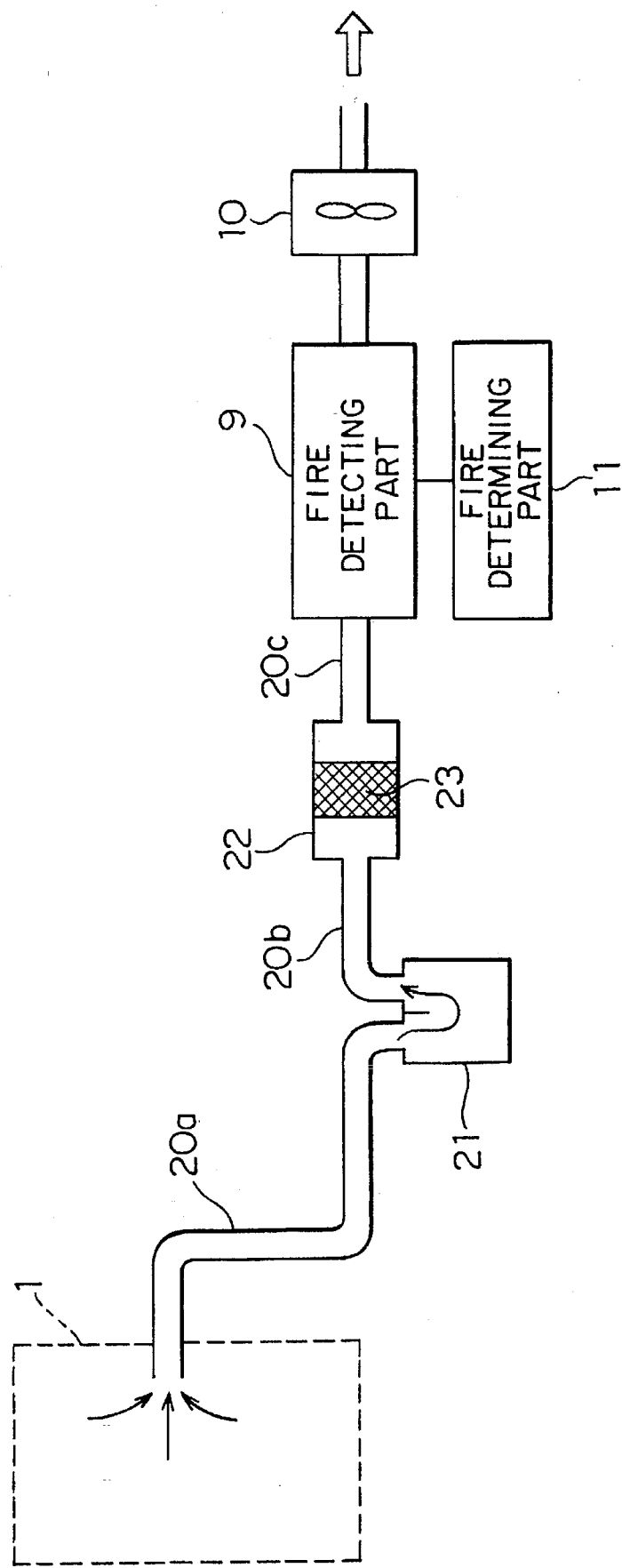
FIG. 1 is a schematic view of the construction of a fire detecting apparatus according to a first embodiment of the present invention.
Figure 6:
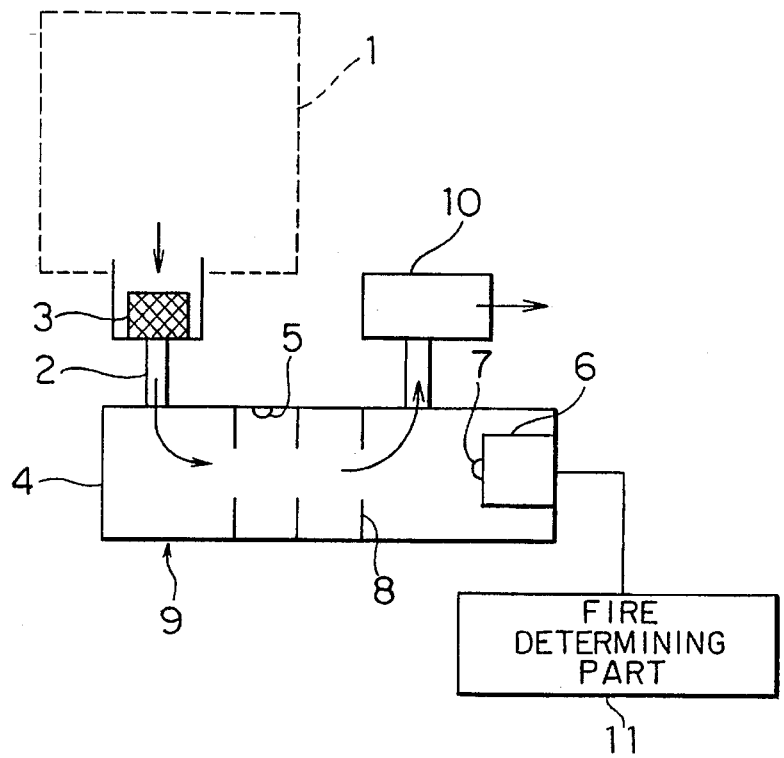
FIG. 6 is a schematic view of the construction of one example of conventional fire detecting apparatuses.

FIG. 1 is a schematic view of the construction of a fire detecting apparatus according to a first embodiment of the present invention, in which the same reference numerals are used without further description for those components which are identical to or correspond to the components shown in FIG. 6. Referring to FIG. 1, a first dust recovering part 21 is connected to a supervision area 1 via piping 20a. The first dust recovering part 21 is adapted to deflect the air flow in a U-shape form therein so as to cause the dust to drop and thus separate from the air flow and then to be recovered by the recovering part 21.

A second dust recovering part 22 is connected downstream of the first dust recovering part 21 via piping 20b. The second dust recovering part 22 has a filter 23 for recovering the dust in the air which has passed through the first dust recovering part 21. The filter 23 is formed of a porous material, such as sponge, or the like. Further, a fire detecting part 9 of a light scattering type, light obscuration type, ionization type, or the like, and a suction fan 10 are connected downstream of the second dust recovering part 22 via piping 20c. A fire determining part 11 is electrically connected to the fire detecting part 9.

A description will now be given of the operation of such a fire detecting apparatus. The suction fan 10 is driven so as to allow the air within the supervision area 1 to be drawn into the first dust recovering part 21 through the piping 20a. The air flow is deflected in a U-shape form in the first dust recovering part 21 so as to cause dirt, such as relatively large and heavy dust particles, insects, or the like, to drop and thus separate from the air flow and then to be recovered by the recovering part 21. The air which has thus passed through the first dust recovering part 21 is drawn into the second dust recovering part 22 and passes through the filter 23, thereby recovering relatively small dust particles which have passed through the first dust recovering part 21.

These first and second dust recovering parts 21 and 22 remove the dust in the air before the air is drawn into the fire detecting part 9. Smoke particles, which are smaller than dust particles, pass through these parts 21 and 22 and are led into the fire detecting part 9. Thus, the fire detecting part 9 is not influenced by the dust which would be brought from the supervision area 1, and accordingly, it is able to detect smoke density with higher precision, thus preventing erroneous operations and improving its reliability as a fire detecting apparatus.

Although the filter 3 is used in the foregoing conventional apparatus as well, it is likely in the conventional apparatus to be clogged with relatively large dirt particles, or the like. In contrast thereto, in the apparatus of this embodiment, after relatively large dirt particles or the like are removed in the first dust recovering part 21 in advance, the air flow passes through the filter 23, which is therefore unlikely to be clogged even if its mesh size is reduced to some extent.

The filter 23 may be replaced by a plurality of filters placed from upstream in the order of larger to smaller meshes.

Second Embodiment

Figure 2:
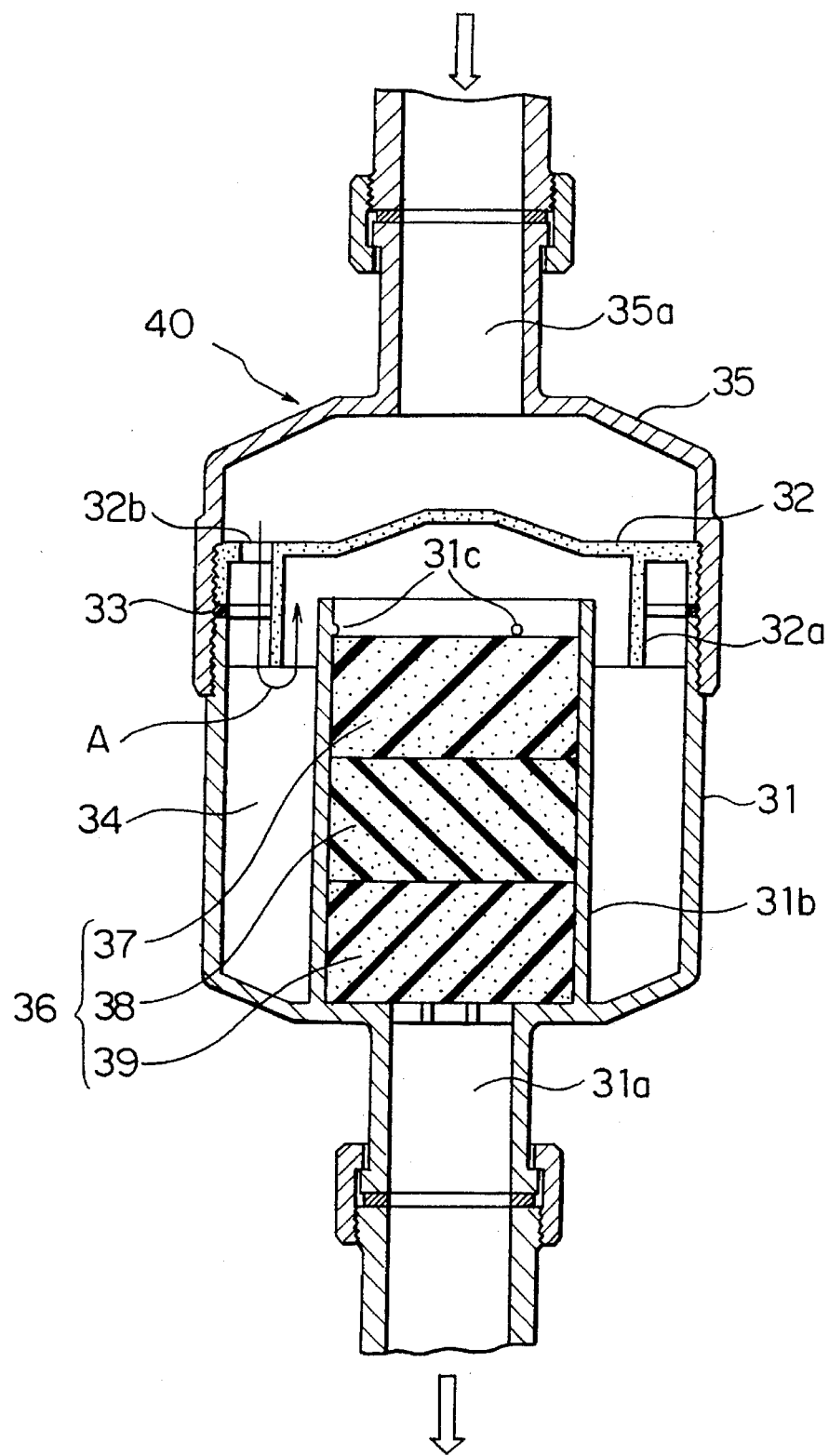
FIG. 2 is a partial sectional view of a fire detecting apparatus according to a second embodiment of the present invention.

FIG. 2 is a partial sectional view of a fire detecting apparatus according to a second embodiment of the present invention. Referring to FIG. 2, an air outlet 31a is arranged at the bottom of a case 31. A cylindrical portion 31b extending upward from the air outlet 31a is formed in the case 31. A partition 32 is bonded onto the case 31 via packing 33. The partition 32 is provided with a ring-like wall 32a protruding downward to surround one end of the cylindrical portion 31b. Further, a plurality of vents 32b (only one is indicated in FIG. 2) are arranged outside the ring-like wall 32a of the partition 32.

A first dust recovering part 34 is formed outside the cylindrical portion 31b within the case 31 and the partition 32. The air flow is deflected in a U-shape form indicated by the arrow A in FIG. 2 on the first dust recovering part 34 so as to cause the dust to drop and separate from the air flow to the outside of the cylindrical portion 31b in the case 31 and then to be recovered by the recovering part 34. A cover 35 is screwed to the top ends of the case 31 and the partition 32. Further, an air inlet 35a is formed on the top end of the cover 35.

A second dust recovering part 36 is arranged in the cylindrical portion 31b. It comprises the first, second and third filters 37, 38 and 39 stacked with each other from upstream in the order of larger to smaller meshes, such filters 37, 38 and 39 being formed of a porous material, such as sponge or the like. Also, a plurality of projections 31c for holding the second dust recovering part 36 are arranged on an inner wall of the cylindrical portion 31b. A dust recovering unit generally denoted by 40 comprises the case 31, the partition 32, the packing 33, the cover 35 and the second dust recovering part 36. The unit 40 is detachably placed between the supervision area 1 and the fire detecting part 9, which are similar than those shown in FIG. 1.

An explanation will now be given of the operation of the above fire detecting apparatus. The air drawn into the air inlet 35a from the supervision area 1 flows into the case 31 through the vents 32b and is deflected as indicated by the arrow A in FIG. 2 on the first dust recovering part 34. Thus, dirt in the air, such as relatively large and heavy dust particles and insects or the like, drops to separate from the air flow and is recovered by the first dust recovering part 34. The air which has thus passed through the first dust recovering part 34 is drawn into the second dust recovering part 36 and sequentially passes through the filters 37, 38 and 39. At this time, the dust and the like, which have passed through the first dust recovering part 34, is grouped into the respective filters 37–39 in the order of larger to smaller sizes so as to be recovered therein.

In the manner described above, the air which has had dust removed after passing through the first and second dust recovering parts 34 and 36 is led into the fire detecting part 9 in which the smoke density can be detected with higher precision, such detection not being influenced by dust in the air which would be brought from the supervision area 1. As a result, it is possible to obtain a highly-reliable fire detecting apparatus, free from erroneous operations.

Further, the second dust recovering part 36 is formed of three-stage filters 37, 38 and 39, thereby preventing the filters 37, 38 and 39 from being clogged. The filter 39 with finer meshes than those of conventional filters can be placed farthest downstream to recover even smaller dust particles, thereby more reliably avoiding erroneous operations caused by dust. Moreover, the first and second dust recovering parts 34 and 36 are integrated to form the dust recovering unit 40, which is detachable from the air inlet passage, thereby facilitating removal of the recovered dust particles by detaching and dissembling the unit 40 and exchange of the filters 37–39.

Third Embodiment

Figure 3:
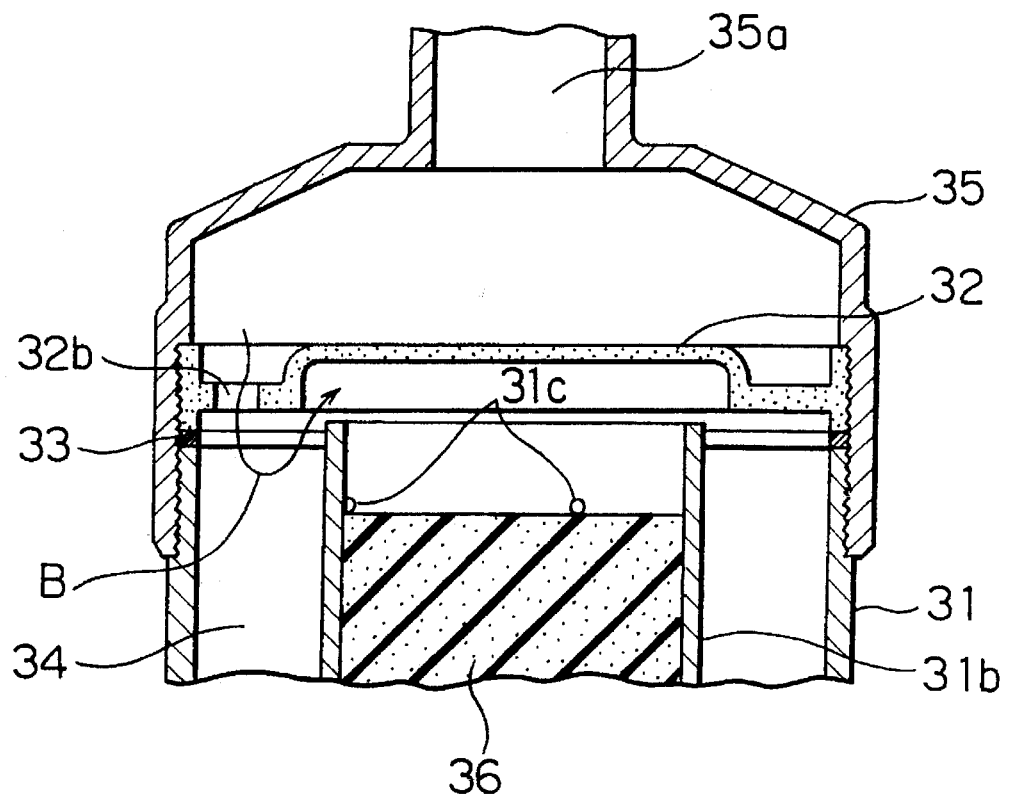
FIG. 3 is a partial sectional view of a fire detecting apparatus according to a third embodiment of the present invention.

FIG. 3 is a partially sectional view of a fire detecting apparatus according to a third embodiment of the present invention. In this embodiment, the ring-like wall 32a is removed from the partition 32 illustrated in FIG. 2. Even though the partition 32 is not provided with the ring-like wall 32a, the first dust recovering part 34 can be constructed such that the air flow is deflected as indicated by the arrow B, and accordingly, advantages similar to those in the above second embodiment can be obtained. In other words, the first dust recovering part 34 may be modified in any form as long as it is constructed to deflect the air flow so as to cause heavy dust particles, dirt and the like, to drop to separate from such flow, in which case the deflecting angle is not particularly restricted.

Fourth Embodiment

Figure 4:
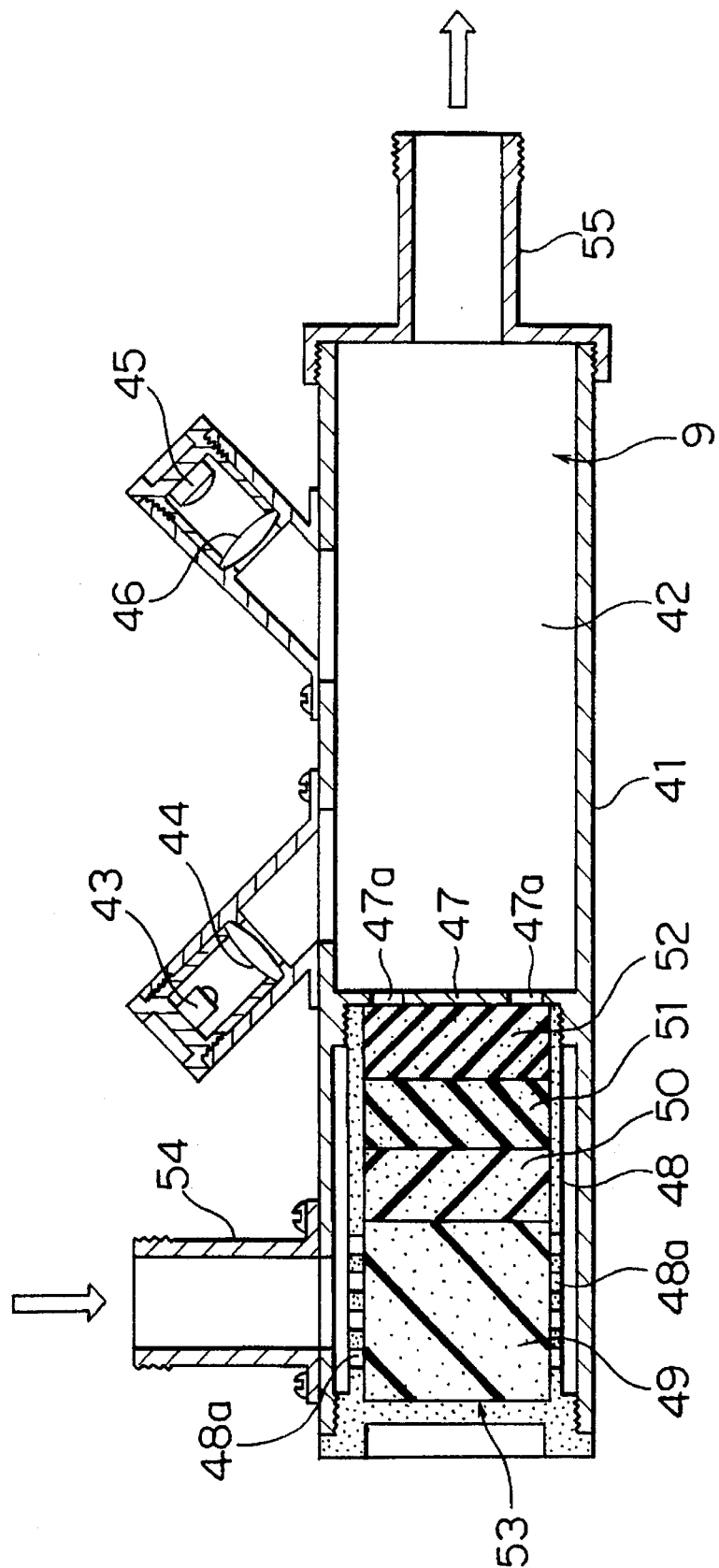
FIG. 4 is a partial sectional view of a fire detecting apparatus according to a fourth embodiment of the present invention.

FIG. 4 is a partially sectional view of a fire detecting apparatus according to a fourth embodiment of the present invention. Referring to FIG. 4, a dark chamber 42 is formed as a smoke detection space in a cylindrical or square casing 41. Fixed to the outside of the casing 41 is a light-emitting device 43 which emits light into the dark chamber 42, such as a light-emitting diode, and a light-receiving device 45 which receives light from the dark chamber 42, such as a solar cell and a photo diode. A lens 44 is arranged in front of the light-emitting device 43 and transforms the light from the light-emitting device 43 into the cylindrical beam. Another lens 46 is arranged in front of the light-receiving device 45 and forms a light-receiving range of the light-receiving device 45 in a cylindrical shape.

An intermediate plate 47 is provided within the casing 41 to partition the dark chamber 42 and is also to be used as a filter holder. The intermediate plate 47 is provided with a plurality of vents (smoke inlet openings) 47a which are placed in, for example, a ring-like shape. A filter accommodating chamber 48 used as a unit case is inserted into any portion in the casing 41 other than the dark chamber 42 so as to serve the function of a lid plate for one end of the casing 41. Also, a plurality of vents 48a are provided for the outer periphery of one end of the filter accommodating chamber 48. First to fourth filters 49–52 formed of a porous material such as sponge or the like, are accommodated within the filter accommodating chamber 48. Such filters 49–52 are stacked from upstream (on the left-hand side of FIG. 4) in the order from larger to smaller meshes. A dust recovering part 53 comprises the first to fourth filters 49–52.

An air inlet 54 for drawing the air into the casing 41 from the supervision area 1, which is similar to that shown in FIG. 1, is attached at the outer periphery of one end to the casing 41, facing the vents 48a. An air outlet 55 is attached at the other end to the casing 41 so as also to be used as a lid for its other end. A suction fan 10 is connected downstream of the air outlet 55 in a manner similar to the first embodiment shown in FIG. 1. The fire detecting part 9 of the fourth embodiment comprises the dark chamber 42, the light-emitting device 43, the lens 44, the light-receiving device 45 and the other lens 46, and the like.

A description will now be given of the operation of such a fire detecting apparatus. The suction fan 10 connected downstream of the air outlet 55 is driven so as to allow the air in the supervision area 1 to be drawn into the casing 41 from the air inlet 54. Then, the air flows into the filter accommodating chamber 48 through the vents 48a and sequentially passes through the first to fourth filters 49–52 in which dust is removed from the air.

The air which has thus passed through the dust recovering part 53 flows into the dark chamber 42 through the vents 47a. In the fire detecting part 9, the light-emitting device 43 is controlled by a light-emitting control circuit (not shown) to emit pulse light intermittently (for example, every three seconds). The light from the light-emitting device 43 is transformed into the cylindrical beam by the lens 44 so as to be applied into the dark chamber 42. The light from the light-emitting device 43 is not normally received by the light-receiving device 45. However, when the air containing smoke flows into the dark chamber 42, the light is irregularly reflected by the smoke particles to produce the scattering light, part of which is collected by the lens 46 so as to be applied to the light-receiving device 45.

The light-receiving device 45 thus generates the received light output, the signal of which is input into the smoke detection circuit of the fire determining part 11 (FIG. 1). The smoke detection circuit determines whether or not the smoke is detectable and, if so, the amount of the smoke detected according to the received light output in synchronism with the light emitted from the device 43. As a result, whether or not a fire has occurred is determined.

In the foregoing fire detecting apparatus, relatively large dust particles, waste, and the like, can be removed by the first filter 49 and the dust which has passed through the first filter 49 is removed by the subsequent second, third and fourth filters 50, 51 and 52. Accordingly, the air drawn into the fire detecting part 9 hardly contains dust, thus avoiding erroneous operations caused by dust which would be brought from the supervision area 1, thereby improving the reliability of the apparatus.

In addition, the respective filters 49–52 are accommodated in the filter accommodating chamber 48 in such a way that they are stacked with each other, and also, the filter accommodating chamber 48 is detachably attached to the casing 41, thus facilitating cleaning and replacement of the filters 49–52. Moreover, in the fourth embodiment, since the dust recovering part 53 and the fire detecting part 9 are built into a single casing 41, the entire apparatus can be downsized.

Fifth Embodiment

Figure 5:
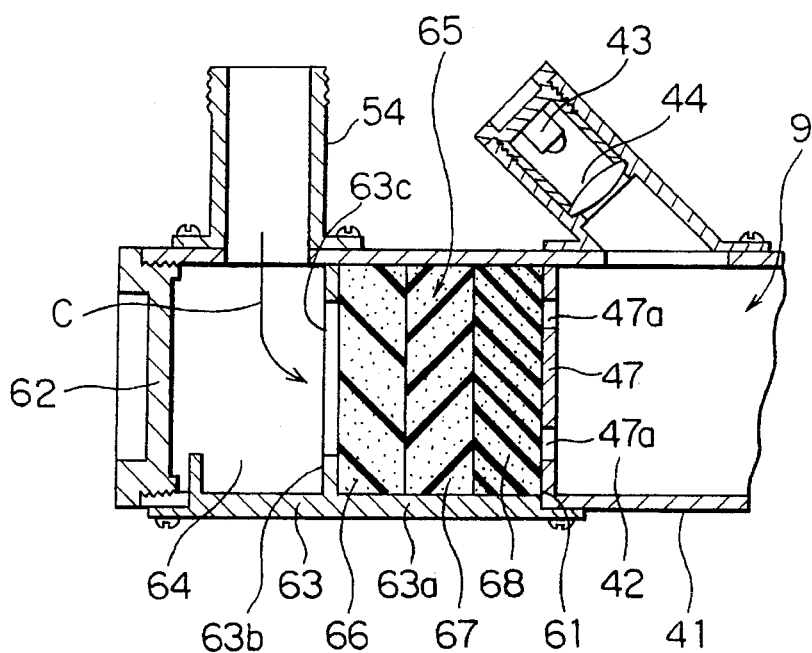
FIG. 5 is a partial sectional view of a fire detecting apparatus according to a fifth embodiment of the present invention.

FIG. 5 is a partially sectional view of a fire detecting apparatus according to a fifth embodiment of the present invention. Referring to FIG. 5, an opening 61 is provided for the casing 41 similar to that shown in FIG. 4. A lid plate 62 is screwed into one end of the casing 41. A dust recovering part cover 63 detachably attached to the casing 41 comprises a cover portion 63a for closing the opening 61 and a partition 63b for partitioning the casing 41. A vent 63c is further provided with the partition 63b.

A first dust recovering part 64 is formed farther upstream (on the left-hand side of the FIG. 5) than the partition 63b in the casing 41. The first dust recovering part 64 is constructed to deflect the air flow as indicated by the arrow C in FIG. 5 so as to cause the dust particles and the like to drop and separate from the air flow and then to be recovered by the recovering part 64. A second dust recovering part 65 is arranged between the partitioning plate 63b and the intermediate plate 47 within the casing 41. The second dust recovering part 65 comprises the first, second and third filters 66, 67 and 68 stacked with each other from the upstream side (on the left-hand side of FIG. 5) in the order from larger to smaller meshes. Such filters 66, 67 and 68 are formed of a porous material, such as sponge or the like. The other constructions of the apparatus are similar to those of the foregoing fourth embodiment.

In the fire detecting apparatus including the first and second recovering parts 64 and 65, the air flow drawn from the supervision area 1 (FIG. 1) is deflected in the first dust recovering part 64 so that relatively large and heavy dust particles, dirt, and the like, can drop and separate from the air to be recovered. The air which has thus passed through the first dust recovering part 64 passes through the second dust recovering part 65 and further through the first, second and third filters 66, 67 and 68 in which the dust is recovered. As a result, the air induced into the fire detecting part 9 hardly contains dust, thus avoiding erroneous operations caused by dust and improving the reliability of the apparatus.

Also, in the apparatus of the fifth embodiment, the dust recovering part cover 63 can be removed from the casing 41, thereby facilitating cleaning of the components within the first dust recovering part 64 and cleaning and replacement of the filters 66, 67 and 68.

Although in each of the above embodiments the filters are formed of a porous material, such as sponge, or the like, they are not limited to such materials and may instead be any other materials as long as they are capable of recovering dust.

The dust recovering parts shown in the above respective embodiments are particularly effective for the use in a fire detecting apparatus which detects the presence of a fire with low smoke density, needless to say, however, they may also be applicable to an ordinary apparatus which is operable at a smoke density of approximately 10%.

Further, the dust recovering parts, the fire detecting part, the fire determining part and the suction fan may be integrated into a single unit, or alternatively, they may be separated and connected to each other via piping, or the like. Besides, when a plurality of filters are used, they may be placed apart from each other. It is also possible to arrange the first dust recovering part to have a plurality of filtering stages.

What is claimed is:

1. A fire detecting apparatus comprising:

a fire detecting part for detecting the presence of a fire in a supervised area by detecting smoke contained in air drawn via an inlet passage from the supervised area;

a first dust recovering part arranged in said inlet passage upstream from said fire detecting part and configured to deflect an air flow within said inlet passage to cause dust particles contained in said air flow to separate from said air flow and drop into a recovery area of said first dust recovering part; and a second dust recovering part arranged in said inlet passage downstream from said first dust recovering part and upstream from said fire detecting part and having a filter unit for capturing additional dust particles contained in said air flow which have passed through said first dust recovering part.

2. A fire detecting apparatus according to claim 1, wherein said filter unit is formed of a porous material.

3. A fire detecting apparatus according to claim 1, wherein said filter unit includes a plurality of filters of respectively different mesh sizes arranged within said inlet passage such that a mesh size of each successive filter decreases in a downstream direction.

4. A fire detecting apparatus according to claim 1, wherein said first and second dust recovering parts are integrated into a single assembly detachably interposed in said inlet passage.

5. A fire detecting apparatus according to claim 4, wherein said single assembly comprises;

a casing including an air outlet, an outer wall enclosure, an end wall protruding inward from said outer wall enclosure to said air outlet, and an inner wall enclosure communicating with said air outlet and spaced from said outer wall enclosure so as to define said recovery area of said first dust recovering part between said outer and inner wall enclosures;

a cover detachably attached to said casing and including an air inlet; and, a partitioning plate arranged between said casing and said cover and configured to deflect the air flow drawn into said air inlet of cover to said recovery area of said first dust recovering part and then to within said inner wall enclosure;

wherein said filter unit of said second dust recovering part is arranged in said inner wall enclosure and includes a plurality of filters of respectively different mesh sizes arranged within inner wall enclosure such that a mesh size of each succesive filter decreases in a downstream direction.

\* \* \* \* \*